(12) United States Patent
Maestas

(10) Patent No.: US 11,771,071 B2
(45) Date of Patent: Oct. 3, 2023

(54) ROD STAND

(71) Applicant: David Maestas, Los Lunas, NM (US)

(72) Inventor: David Maestas, Los Lunas, NM (US)

( * ) Notice: Subject to any disclaimer, the term of this patent is extended or adjusted under 35 U.S.C. 154(b) by 107 days.

(21) Appl. No.: 17/017,579

(22) Filed: Sep. 10, 2020

(65) Prior Publication Data
US 2021/0068382 A1 Mar. 11, 2021

Related U.S. Application Data

(60) Provisional application No. 62/898,106, filed on Sep. 10, 2019.

(51) Int. Cl.
*A01K 97/00* (2006.01)
*A01K 97/10* (2006.01)

(52) U.S. Cl.
CPC .................................. *A01K 97/10* (2013.01)

(58) Field of Classification Search
CPC ......... A01K 97/10; A01K 87/02; A01K 99/00
USPC .............................. 248/519, 520; 43/21.2, 25
See application file for complete search history.

(56) References Cited

U.S. PATENT DOCUMENTS

| | | | | |
|---|---|---|---|---|
| 2,003,535 A * | 6/1935 | Haskin | .................... | A01K 97/10 248/538 |
| 2,311,823 A * | 2/1943 | Gaskill | .................. | A01K 97/10 43/21.2 |
| 3,530,611 A * | 9/1970 | Britt | ..................... | A01K 89/015 43/17 |
| 3,713,131 A * | 1/1973 | Marshall | ................. | A01K 97/10 43/17 |
| 3,846,929 A * | 11/1974 | McBride | ................ | A01K 97/10 43/17 |
| 4,177,595 A * | 12/1979 | Chon | ..................... | A01K 97/10 248/183.2 |
| 4,550,520 A * | 11/1985 | Bogue | .................... | A01K 97/10 248/512 |
| 4,653,716 A * | 3/1987 | Sakaguchi | ............ | F16L 3/1203 248/316.5 |
| 4,677,783 A * | 7/1987 | Cratsa | .................... | A01K 97/11 43/15 |
| 4,854,069 A * | 8/1989 | Smith | .................... | A01K 97/10 43/21.2 |
| 4,972,621 A * | 11/1990 | Tucker | ................... | A01K 97/10 248/533 |
| 5,054,737 A * | 10/1991 | DeLancey | .............. | A01K 97/10 248/515 |
| 5,228,228 A * | 7/1993 | Meissner | ............. | A01K 97/125 43/17 |
| 5,588,630 A * | 12/1996 | Chen-Chao | ............. | F16C 11/10 248/514 |
| 5,867,931 A * | 2/1999 | Morris | ................. | A01K 97/125 43/17 |

(Continued)

*Primary Examiner* — Richard T Price, Jr.
(74) *Attorney, Agent, or Firm* — LOZA & LOZA, LLP; Kevin L. Soules

(57) ABSTRACT

A system, method, and/or apparatus comprises a rod clasp, a leg fitting formed on the rod clasp, and at least one leg attached to the rod clasp with the leg fitting. The system can further comprise a strike indicator formed on an exterior of the rod clasp. The system can further comprise a light formed on an exterior of the rod clasp and a switch connected to the light. The system can further comprise a speaker formed on an exterior of the rod clasp. The leg can further comprise at least two subsections wherein the subsections are telescoping.

10 Claims, 16 Drawing Sheets

(56) References Cited

U.S. PATENT DOCUMENTS

| | | | | |
|---|---|---|---|---|
| 5,992,080 A * | 11/1999 | Allen | A01K 97/11 43/18.1 R | |
| 6,050,020 A * | 4/2000 | Sizemore | A01K 97/11 43/15 | |
| 6,128,848 A * | 10/2000 | Wong | A01K 97/10 43/21.2 | |
| 6,155,529 A * | 12/2000 | De Carlo | A47G 7/041 248/519 | |
| 6,651,374 B1 * | 11/2003 | Ridlen | A01K 97/10 248/514 | |
| 6,718,682 B1 * | 4/2004 | Seitsinger | A01K 97/10 248/513 | |
| 6,935,068 B2 * | 8/2005 | Shackelford | A01K 97/125 43/17 | |
| 7,213,361 B1 * | 5/2007 | Perigo, Sr. | A01K 97/10 248/533 | |
| D659,223 S * | 5/2012 | Lefgren | D22/147 | |
| 8,276,310 B1 * | 10/2012 | Weber | A01K 97/10 43/21.2 | |
| 8,453,372 B1 * | 6/2013 | Moe | A01K 97/10 43/17 | |
| 10,154,659 B2 * | 12/2018 | Smith | A45F 3/44 | |
| 10,798,931 B1 * | 10/2020 | Canny | A01K 97/125 | |
| 10,874,094 B1 * | 12/2020 | Kowalski | G08B 7/06 | |
| 2002/0113710 A1 * | 8/2002 | Brake | A01K 97/10 340/573.2 | |
| 2009/0158635 A1 * | 6/2009 | Hope | A01K 97/125 43/4.5 | |
| 2011/0139956 A1 * | 6/2011 | Caswell | F16M 11/42 248/519 | |
| 2012/0204469 A1 * | 8/2012 | Kowalski | A01K 97/10 43/4.5 | |
| 2013/0125445 A1 * | 5/2013 | Schmitt | A01K 97/10 43/4.5 | |
| 2013/0255130 A1 * | 10/2013 | Baugh | A01K 97/01 43/4.5 | |
| 2014/0332655 A1 * | 11/2014 | Colbert | A01K 97/08 248/512 | |
| 2016/0073618 A1 * | 3/2016 | Smith | A01K 87/02 403/286 | |

* cited by examiner

ROD STAND

CROSS-REFERENCE TO RELATED APPLICATIONS

This patent application claims the priority and benefit under 35 U.S.C. § 119(e) of U.S. Provisional Patent Application Ser. No. 62/898,106 filed Sep. 10, 2019, titled "ROD STAND." U.S. Provisional Patent Application Ser. No. 62/898,106 is herein incorporated by reference in its entirety.

TECHNICAL FIELD

Embodiments are generally related to the field of stands. Embodiments are also related to the field of fishing devices. Embodiments are further related to the field of fishing poles and fishing pole stands. Embodiments are also related to methods, systems, and devices for holding a fishing pole, rod, firearm, or other such device.

BACKGROUND

Hunting and fishing are popular recreational activities. A vast array of products associated with hunting and fishing are available, each of which is meant to improve or enhance the experience. Many of the products available to hunters and anglers provide specific or incremental improvements to the equipment most outdoor enthusiasts use.

As a result, many hunters and anglers have acquired a substantial amount of gear that they expect to bring on an excursion. While these products may be useful, they are also difficult to manage. For example, in addition to their fishing rod, a typical angler may also have, one or more boxes for carrying tackle, a chair, bait, a boat, boat related equipment, a live well, an ice chest, etc., not to mention that they may be accompanied by other anglers, including children, that may need to be monitored.

In addition, while angling, it is often necessary to set a fishing rod down, while some other action or distraction demands the angler's attention. This creates a problem as the angler is forced to identify a convenient place to leave the rod, preferably properly angled slightly from the ground, while the angler attends to the other matter. Currently, common solutions to this situation include hammering the rod it into the ground and/or carrying a separate rod stand. Additionally, some may repurpose another device, such as a stick or tackle box, to hold the rod.

Accordingly, there is a need in the art for systems and methods that provide a convenient way for anglers to set down their fishing rod, as described in the embodiments disclosed herein.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method, system, and apparatus for a stand.

It is another aspect of the disclosed embodiments to provide a method, system, and apparatus for holding a fishing rod.

It is another aspect of the disclosed embodiments to provide a stand for holding a fishing rod during use.

It is another aspect of the disclosed embodiments to provide a portable and removable stand for a fishing rod.

It is yet another aspect of the disclosed embodiments to provide a fishing rod stand that can be quickly deployed and that does not interfere with normal use of the fishing rod.

It will be appreciated that the methods and systems can be achieved according to the embodiments disclosed herein. In one such embodiment, a system, method, and/or apparatus comprises a rod clasp, a leg fitting formed on the rod clasp, and at least one leg attached to the rod clasp with the leg fitting. The system can further comprise a strike indicator formed on an exterior of the rod clasp. The system can further comprise a light formed on an exterior of the rod clasp and a switch connected to the light. The system can further comprise a speaker formed on an exterior of the rod clasp. The leg can further comprise at least two subsections wherein the subsections are telescoping.

In an embodiment, the rod clasp further comprises at least one of: a shell clamp, a snap clip, a c-clamp, a lever clamp, a hinge and lever clamp, and a hook clamp.

The system can further comprise a bushing arranged between a rod and the rod clasp. The system can further comprise at least one ground spike formed on an end of the at least one leg. The system can further comprise a spring formed in the leg fitting, the spring being configured to bias the at least one leg into one of a deployed position and a stored position. The system can further comprise a fishing rod, wherein the rod clasp is installed on the fishing rod.

BRIEF DESCRIPTION OF THE FIGURES

The accompanying figures, in which like reference numerals refer to identical or functionally-similar elements throughout the separate views, which are incorporated in and form a part of the specification, further illustrate the embodiments and, together with the detailed description, serve to explain the embodiments disclosed herein.

DETAILED DESCRIPTION

Figure 1A:
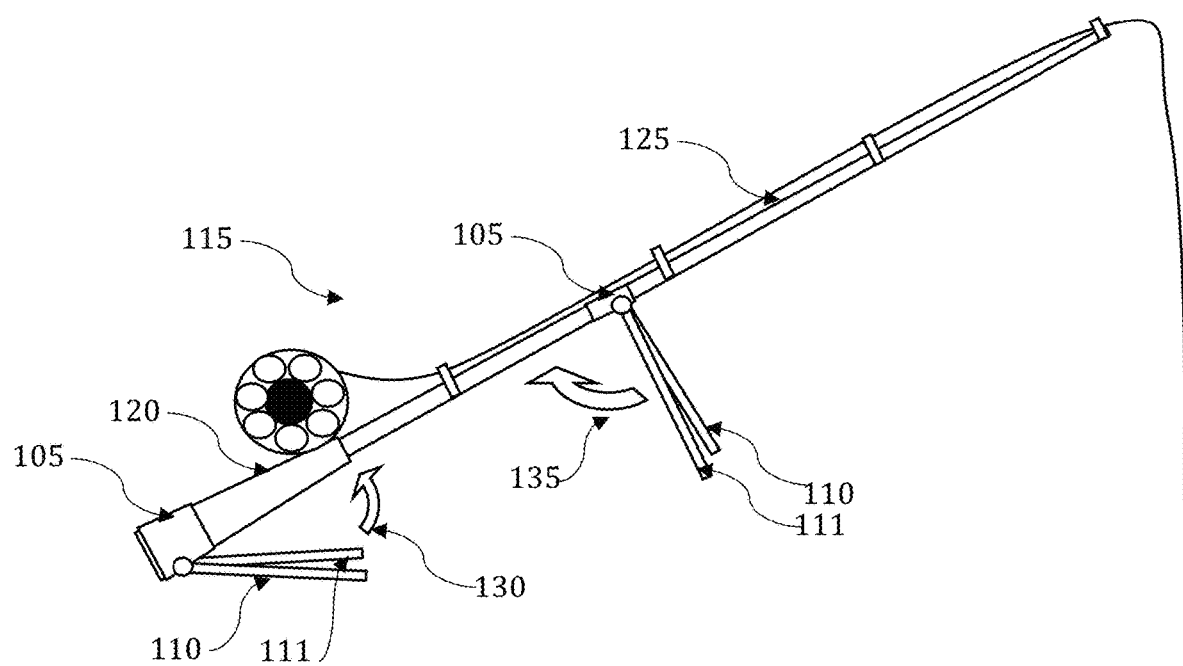
FIG. 1A depicts a rod clamp system which is implemented in accordance with the disclosed embodiments.

The particular values and configurations discussed in the following non-limiting examples can be varied, and are cited merely to illustrate one or more embodiments, and are not intended to limit the scope thereof.

Example embodiments will now be described more fully hereinafter, with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, Aft AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, Aft BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

The embodiments disclosed herein describe methods, systems, and apparatuses for holding a fishing rod as illustrated in FIG. 1A. The embodiments generally include a rod clasp 105 with one or more integrated legs 110 and 111. The rod clasp 105 is configured to engage a fishing rod 115 either on the grip 120 or along the pole 125 of the fishing rod, or both. The legs 110 and 111 are connected to the rod clasp 105 with a hinged connection that allows the legs 110 and 111 to be folded into a position substantially parallel to that of the rod 115 when the stand is not in use. This action is indicated by arrow 130 and by arrow 135.

Figure 1B:
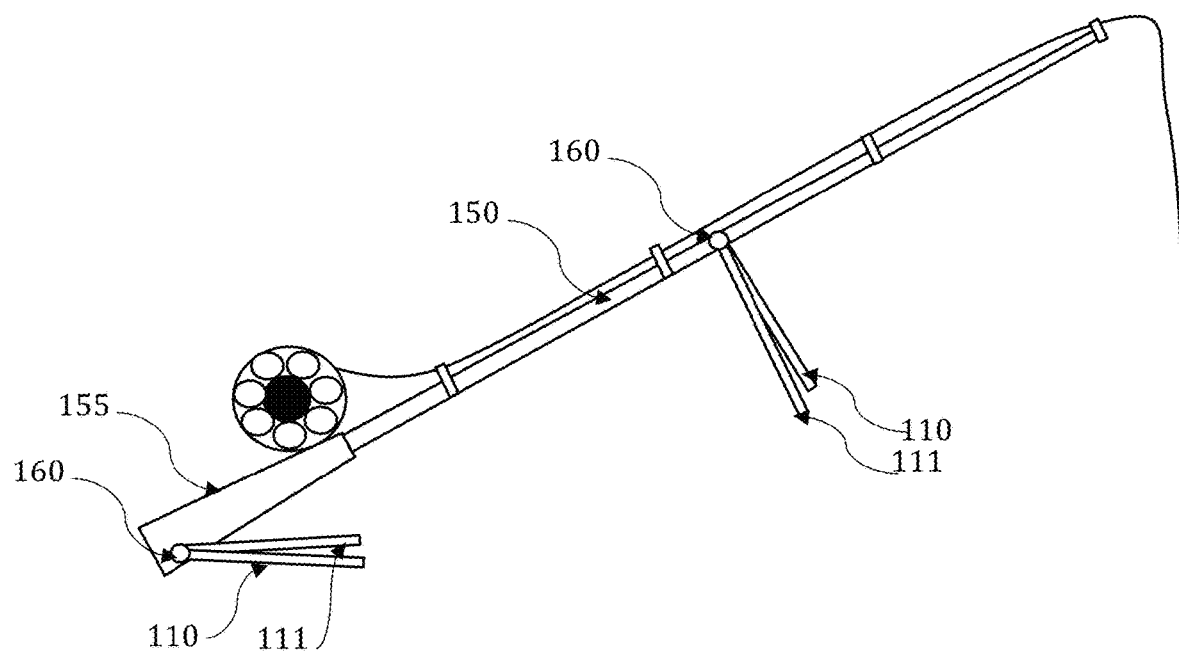
FIG. 1B depicts a rod stand system, in accordance with the disclosed embodiments.

In FIG. 1B another embodiment is illustrated where the pole 105 includes integrated legs 110 and 111. In this embodiment, a hinged connection 160 is configured into the pole 150 and/or grip 155. The hinged connection allows the legs 110 and 111 to be folded into a position substantially parallel to that of the rod 150 when the stand is not in use. It should be appreciated that, various aspects of the embodiments disclosed herein can be adapted for use in the embodiment illustrated in FIG. 1B, wherein the connection between the rod and the stand is formed in the pole and/or grip itself.

Figure 2:
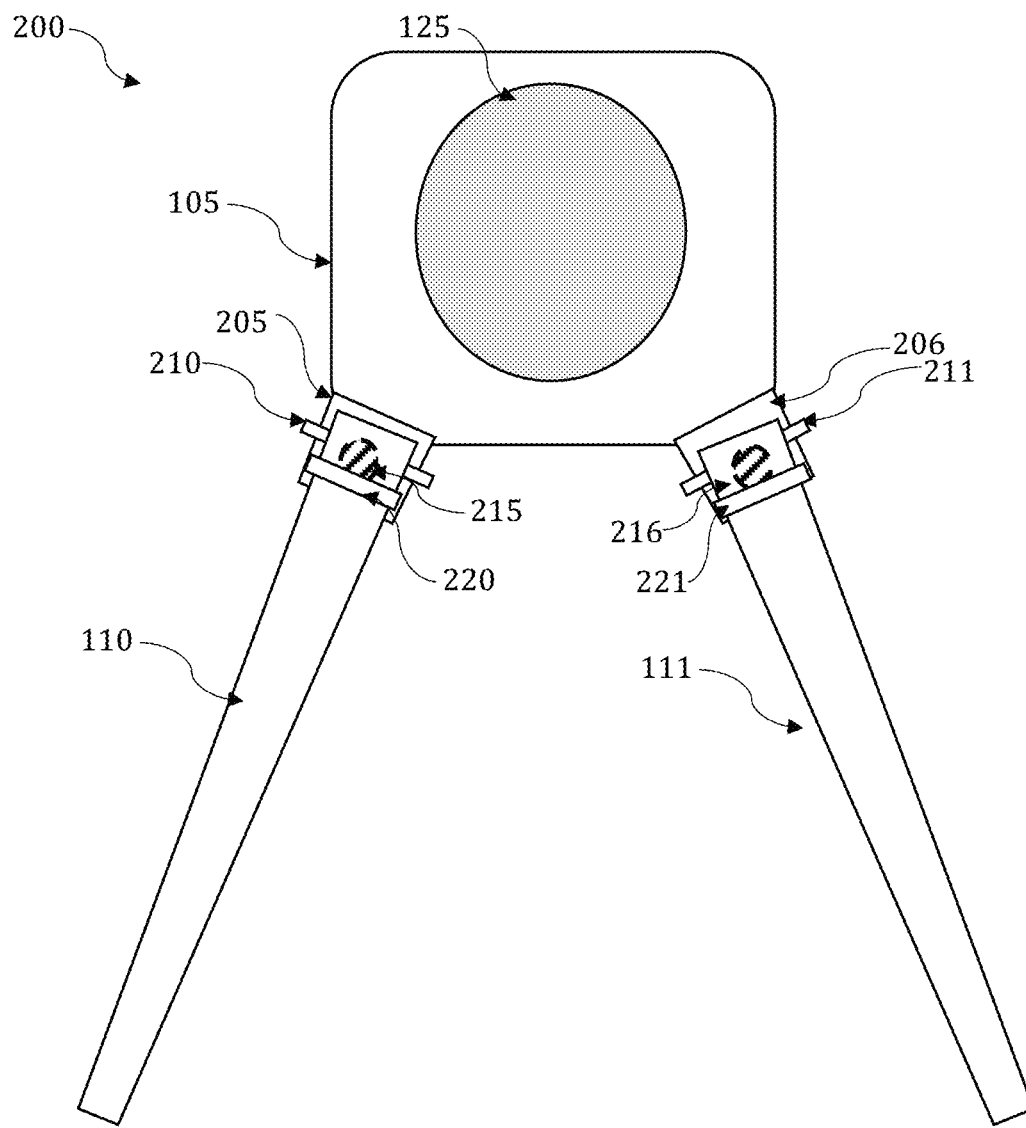
FIG. 2 depicts an elevation view of a rod stand system, in accordance with the disclosed embodiments.

FIG. 2. illustrates a rod stand system 200 in accordance with the disclosed embodiments. The rod stand system 200, includes a rod clasp 105 connected to leg 110 via a leg fitting 205, and connected to leg 111 via a leg fitting 206. The leg fittings 205 and 206 are configured to have an opening on the back side such that the legs 110 and 111 can be folded down into a position substantially parallel to that of the fishing rod. In other embodiments, leg fitting 205 and leg fitting 206 can be formed into the pole 150 and/or grip 155 of the fishing rod as illustrated in FIG. 1B.

When the leg 110 is moved into position, a pin 210 can be inserted through a pin fitting in the top of leg 110, and through a set of holes in the leg fitting 205. The pin 210 holds the leg 110 in its deployed position. A spring 215 can be formed in the leg fitting 205 to bias the leg 110 into either its stored or deployed position. A safety clasp 220 can be provided to lock the leg 110 into position once it is deployed (or stored). The safety clasp 220 can be connected to the leg fitting 205 with a hinge, which allows the safety clasp 220 to open and close. The safety clasp 220 can further include a fastener (e.g. a snap, clasp, post and hole, etc.) that secures the safety clasp 220 to the leg fitting 205 when it is in a closed position.

Likewise, when the leg 111 is moved into position a pin 211 can be inserted through a pin fitting in the top of leg 111, and through a set of holes in the leg fitting 206. The pin 211 holds the leg 111 in its deployed position. A spring 216 can be formed in the leg fitting 206 to bias the leg 111 into either its stored or deployed position. A safety clasp 221 can be provided to lock the leg 111 into position once it is deployed or stored. The safety clasp 221 can be connected to the leg fitting 206 with a hinge, which allows the safety clasp 221 to open and close. The safety clasp 221 can further include a fastener (e.g. a snap, clasp, post and hole, etc.) that secures the safety clasp 221 to the leg fitting 206 when it is in a closed position. In other embodiments, the legs can be screwed in, snapped into place, and/or use a hinge to pop them in place. The legs can also be turned into place in certain embodiments.

In certain embodiments, the angle of one or more of the legs 110 and 111 can be adjusted according to conditions. The legs can be configured to be telescopic and can move independently from one another. This makes them adjustable in height to accommodate various external conditions and terrain elements.

Figure 3A:
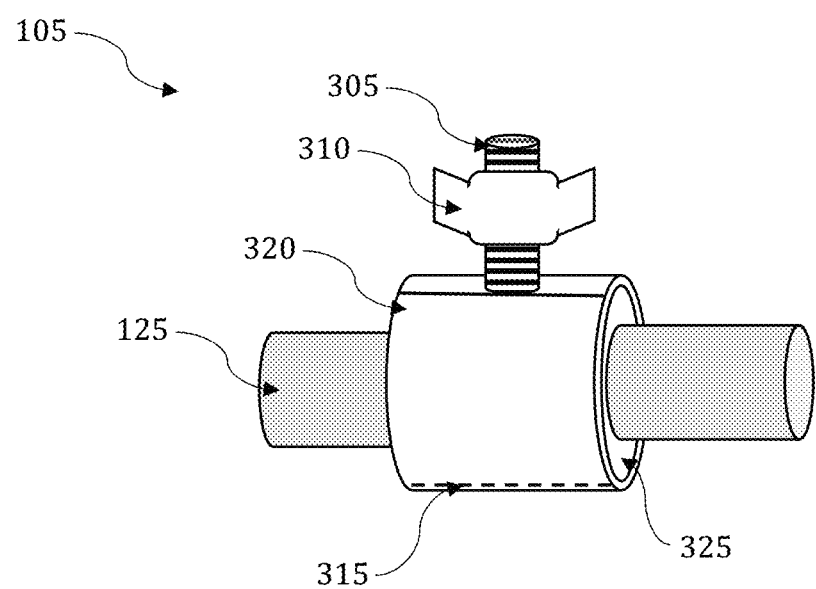
FIG. 3A illustrates a rod clasp, in accordance with an example embodiment.

The rod clasp 105 can be embodied in a number of ways. In one embodiment, illustrated in FIG. 3A, the rod clasp 105 can be a shell clamp 320. The shell clamp 320 includes a hinge 315 that allows the shell clamp 320 to open and close. The bottom half of the shell clamp can include a permanently affixed bolt shaft 305. The top half of the shell clamp 320 can include a hole through which the bolt shaft 305 fits when the shell clamp 320 is closed. The shell clamp 320 can be secured around the rod 125 by tightening a wing nut 310 (or other such fastener) around the bolt shaft 305.

The shell clamp 320 can include a bushing 325, sleeve, or other such fitting, formed along its inner surface. The bushing 325 is preferably malleable so that, as the shell clamp 320 is tightened around the rod, the bushing improves the fit on the rod 125. This is important because it allows the shell clamp to be installed along the rod at any location even though the diameter of the rod changes along its length. In certain embodiments, the bushing 325 can have an outer diameter that matches that of the shell clamp 320, and an inner diameter that is tapered, to match the basic tapered shape of a rod. In addition, the bushing provides a softer interface between the rod clasp 105 and rod 125, preventing damage to the rod 125 and improving the frictional grip with the rod 125 to prevent the rod clasp 105 from slipping.

In additional embodiments, the rod clasp 105 can have a tapered diameter along its length, narrowing at the distal end. The tapered shape is intended to match the similarly tapering shape of most rods 125 providing a better fit between the rod clasp 105 and the rod 125.

Figure 3B:
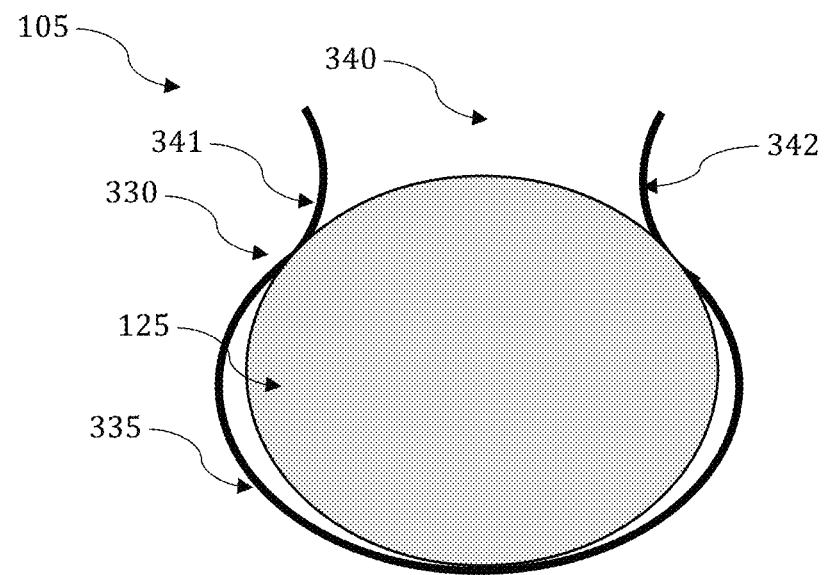
FIG. 3B illustrates another rod clasp, in accordance with an example embodiment.
Figure 3B:
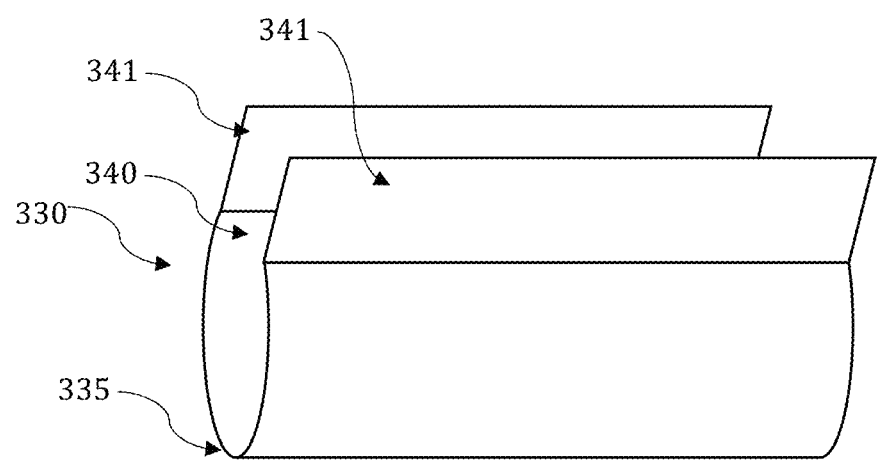

FIG. 3B illustrates another embodiment of rod clasp 105 illustrated in a front view and a side view. In this case the rod clasp 105 is embodied as a snap clip 330. The snap clip 330 is formed with a tubular rod-holding form 335 that is open on one side 340. The open side 340 is defined by arm 341 and arm 342 that extend away from the rod holding form 335 with a shape that naturally creates a force on a rod 125 holding it in place in the rod holding form 335. However, the shape of arm 341 and arm 342 is such that a rod can be "snapped" down through the open side 340 between the arms into position in the rod holding form 335, and that with sufficient pressure, the rod can be extricated from the rod holding form 335 through the open side 340. As with the other embodiments, the snap clip 330 can include a bushing and can be tapered in certain cases. In certain embodiments, multiple sizes of the snap clip 330 can be provided to account for rods of varying diameters.

Figure 3C:
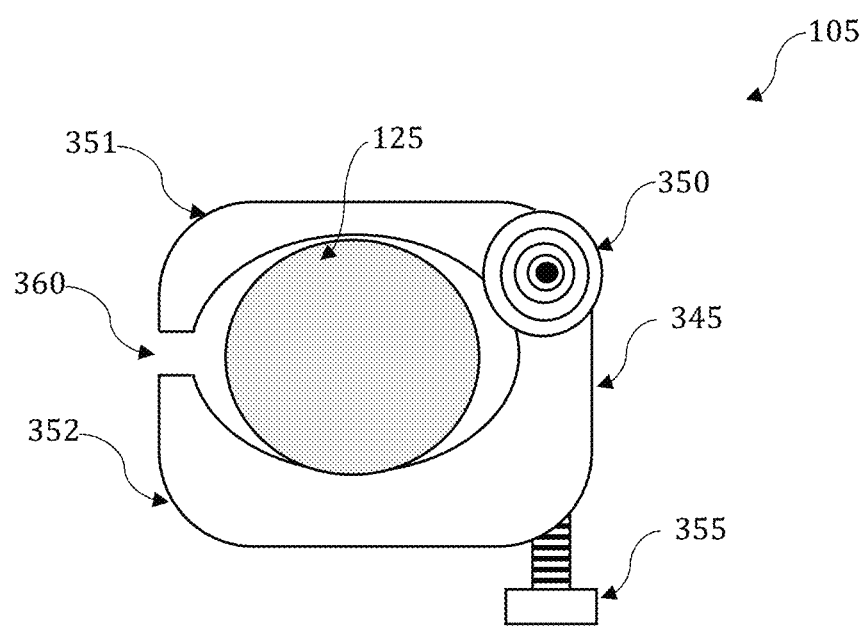
FIG. 3C illustrates another rod clasp, in accordance with an example embodiment.

FIG. 3C illustrates another embodiment of rod clasp 105. In this case, the rod clasp 105 is embodied as a C-clamp 345. The C-clamp 345 includes an upper jaw 351 and a lower jaw 352 which are connected by a spring 350. In certain aspects, the spring 350 may also be embodied as a screw, hinge or other such connective device. The distance between the upper jaw 351 and lower jaw 352, represented as opening 360, is adjustable so that the opening can be adjusted to the diameter of the rod 125 where installation of the rod clasp 105 is desired. A set screw 355 can be used to tighten or loosen the grip of the C-clamp 345 around the rod 125. As with the other embodiments, the C-clamp 345 can include a bushing and can be tapered in certain cases. In certain embodiments, the spring assists the opening of the clamp. The screw adjusts the diameter of the claim to match the diameter of the rod where the clamp grasps the rod.

Figure 3D:
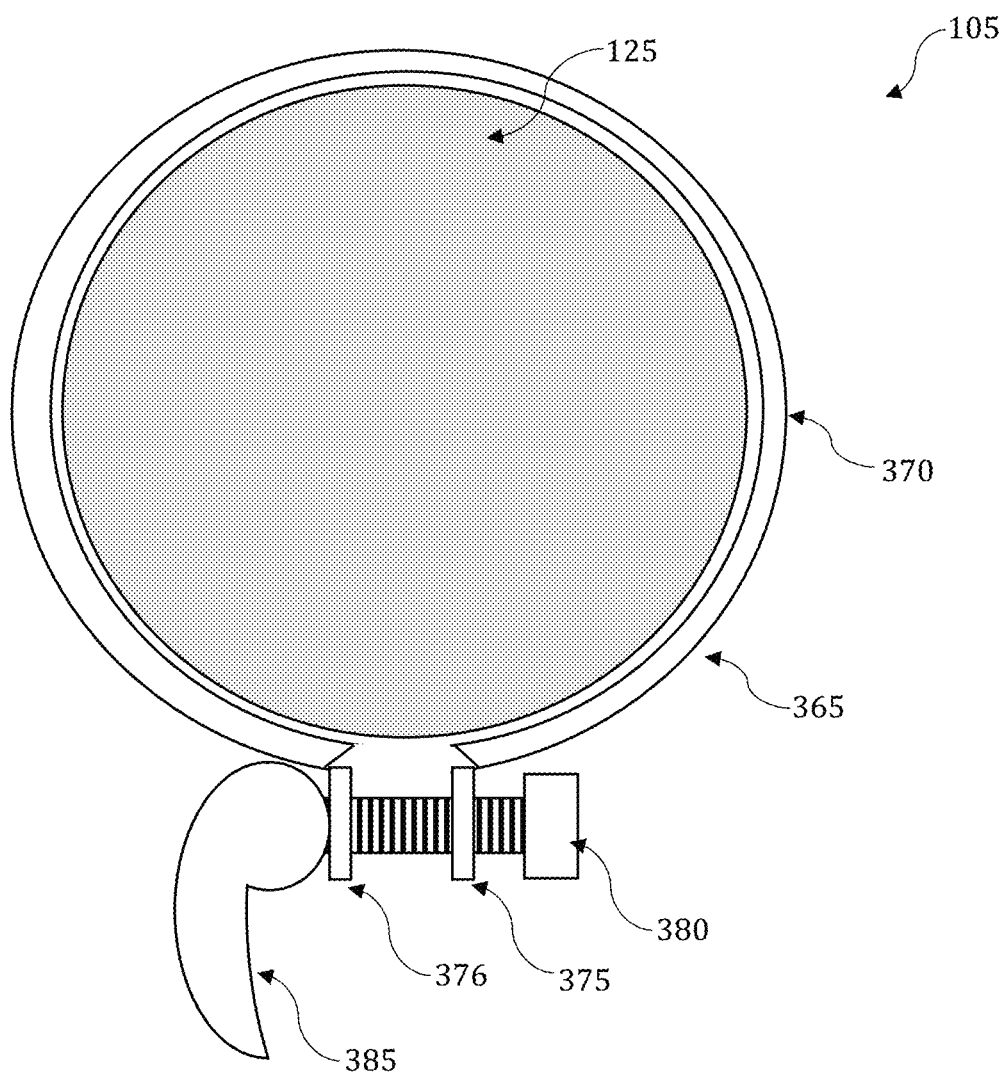
FIG. 3D illustrates another rod clasp, in accordance with an example embodiment.

FIG. 3D illustrates another embodiment of rod clasp 105. In this case, the rod clasp 105 is embodied as a lever clamp 365. The lever clamp 365 generally includes a tubular clamp body 370. One end of the clamp body 370 includes a bolt fitting 375 and the other end includes a bolt fitting 376. A bolt 380 (or other such fastening device) is inserted through the bolt fitting 375 and bolt fitting 376. The bolt can be engaged to a lever 385 once it is inserted through the respective bolt fittings 375 and 380. The lever can be used to tighten the clamp body 370 around a rod 125 once the lever clamp is fitted around the rod 125. As with the other embodiments, the lever clamp 365 can include a bushing and can be tapered in certain cases. In such embodiments, the lever includes the screw with a bolt through the opposing side. Once the clasp is fitted over the rod, the screw engages both pieces of material, and the nut is screwed onto the bolt. The lever then can be used to tighten the two pieces to material together.

Figure 3E:
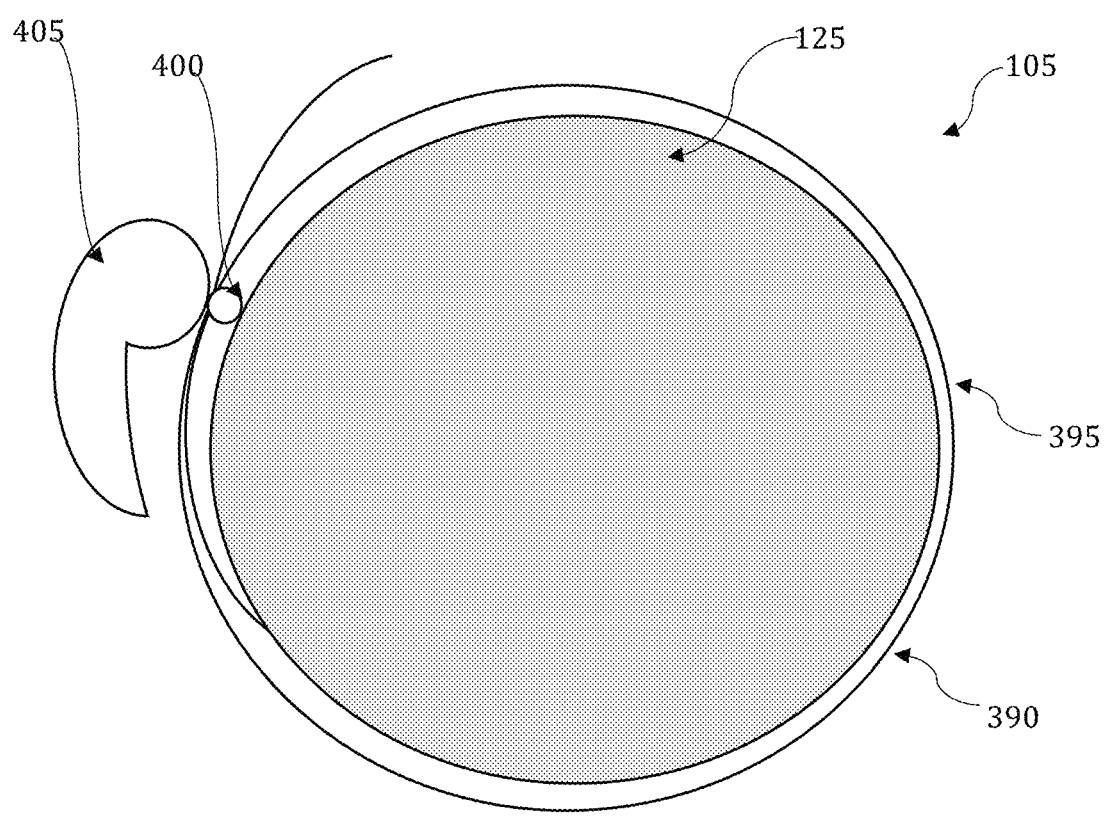
FIG. 3E illustrates another rod clasp, in accordance with an example embodiment.

FIG. 3E illustrates another embodiment of rod clasp 105. In this case, the rod clasp 105 is embodied as a hinge and lever clamp 390. The lever clamp 390 includes a hinge and lever clamp body 395, a hinge 400 and a clamp 405. The rod can fit into an opening in the claps. Extra material is provided on the inside of the device and is used to fill vacant space. The lever includes a buckle and hook. When the buckle is placed over the hook, the lever can be used to cinch the buckle around the rod.

Figure 3F:
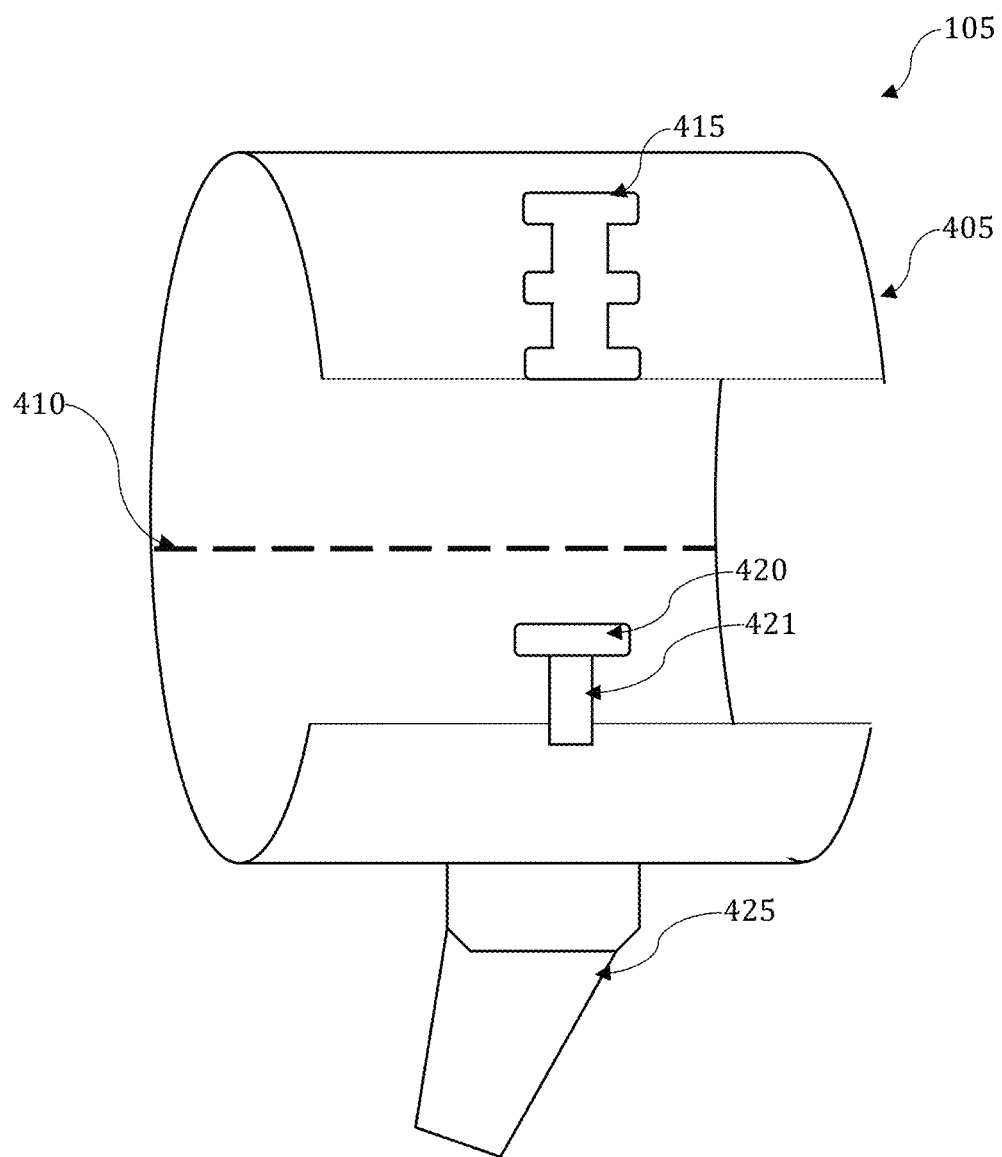
FIG. 3F illustrates another rod clasp, in accordance with an example embodiment.

FIG. 3F illustrates yet another embodiment of a rod clasp 105. In this case, the rod clasp 105 is embodied as a hook clamp 410. The hook clamp 410 is generally tubular or C-shaped with a hinge that allows the hook clamp 410 to open and close. The upper side of the hook clamp 410 includes a series of hook inserts 415. The hook inserts 415 are openings formed in the body of the hook clamp 410, into which a hook fastener 420 can engage. It should be noted that the hook inserts 415 include multiple sites where the hook fastener 420 can engage. The various sites allow the diameter of the hook clamp 410 to be selected to appropriately fit with the rod to which the hook clamp 405 is being bound.

The hook fastener 420 includes a neck 421 that is connected to a lever 425. Once the hook clamp 410 has been closed around a rod and the hook fastener 420 is engaged with the desired hook insert 415, the lever 425 can be actuated to tighten the connection around the rod. Similarly, the lever 425 can be actuated in the opposite direction to loosen the connection if the position of the hook clamp 410 needs to be adjusted along the rod or removed. As with the other embodiments, the hook clamp 410 can include a bushing and can be tapered in certain cases.

It should be understood that the embodiments of rod clasp 105 illustrated in FIGS. 3A-3F do not show legs or leg fittings for purposes of simplicity. It should be understood that each of these embodiments can include leg fittings and legs as disclosed herein.

Figure 4A:
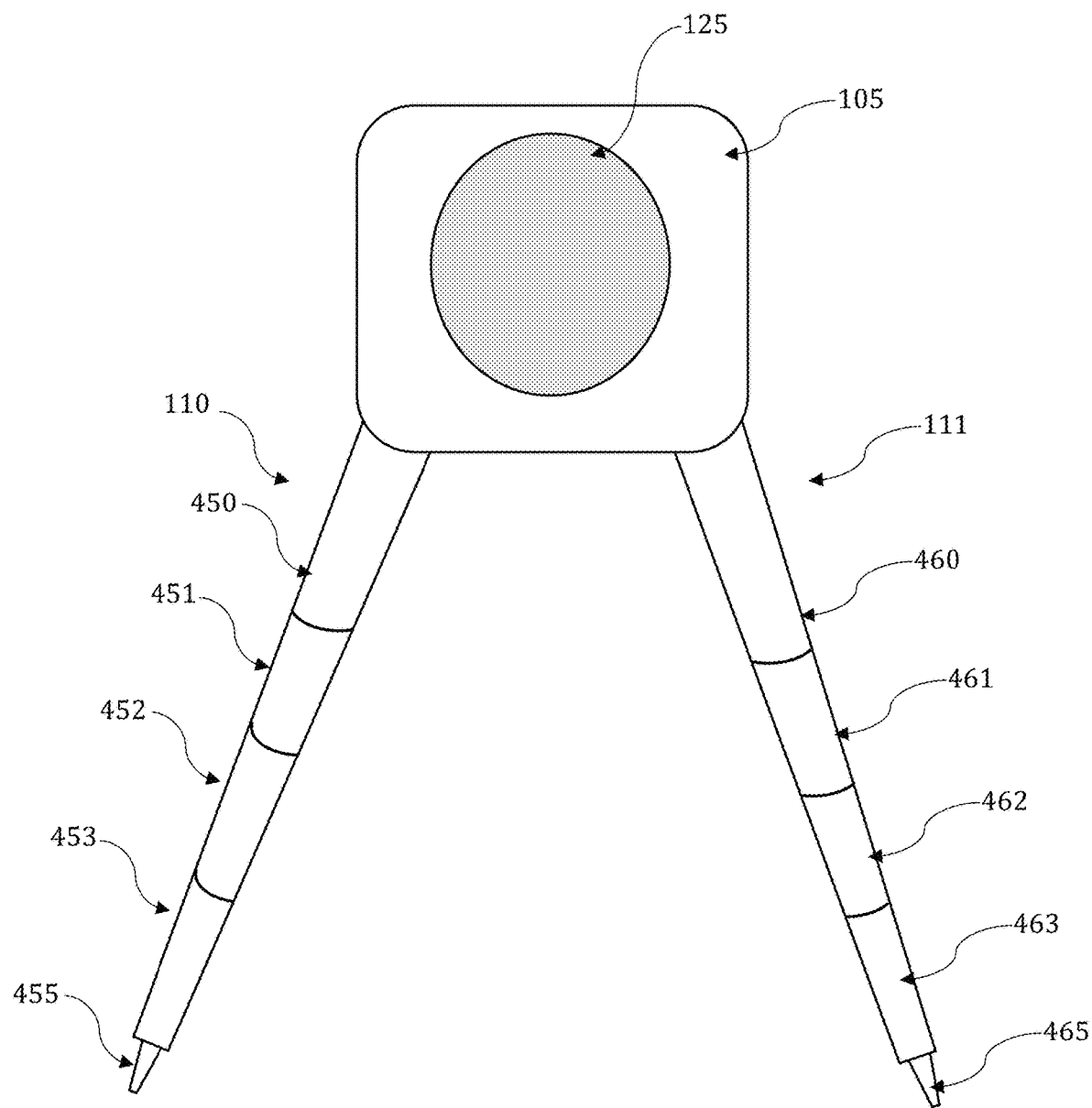
FIG. 4A depicts a rod clamp system with telescoping legs in accordance with the disclosed embodiments.

FIGS. 4A-4D illustrate various embodiments of the rod clasp 105 that include various aspects of leg 110 and leg 111. In FIG. 4A, the leg 110 and leg 111 comprise, telescoping subsections. Leg 110 includes leg section 450, with a tapering diameter, the end of which interfaces with tapering leg section 451. Leg section 451 interfaces with tapering leg section 452, and leg section 452 interfaces with the lower most tapering leg section 453. Similarly, leg 111 includes leg section 460, with a tapering diameter, the end of which interfaces with tapering leg section 461. Leg section 461 interfaces with tapering leg section 462, and leg section 462 interfaces with the lower most tapering leg section 463.

Each of the subsections of leg 110 and leg 111 can be nested or telescoping so that the smaller diameter leg sections fit inside the larger diameter leg sections. The legs can be held in place with a lever that tightens them at desired lengths, or by constriction, realized by twisting one section of leg with respect to another, to tighten the section in place.

The bottom of leg 110, e.g. leg section 453, can include a ground spike 455. The ground spike 455 is configured to be tapered with a pointed, or substantially pointed tip. The ground spike is designed to be easily inserted into the ground so that the rod clasp 105 can be secured in place. Likewise, the bottom of leg 111, e.g. leg section 463, can include a ground spike 465. The ground spike 465 is configured to be tapered with a pointed, or substantially pointed tip. The ground spike 465 is also designed to be easily inserted into the ground so that the rod clasp 105 can be secured in place. It should be understood that the ground spike 455 and ground spike 465 can be included with other embodiments of leg 110 and leg 111 respectively, as disclosed herein.

Figure 4B:
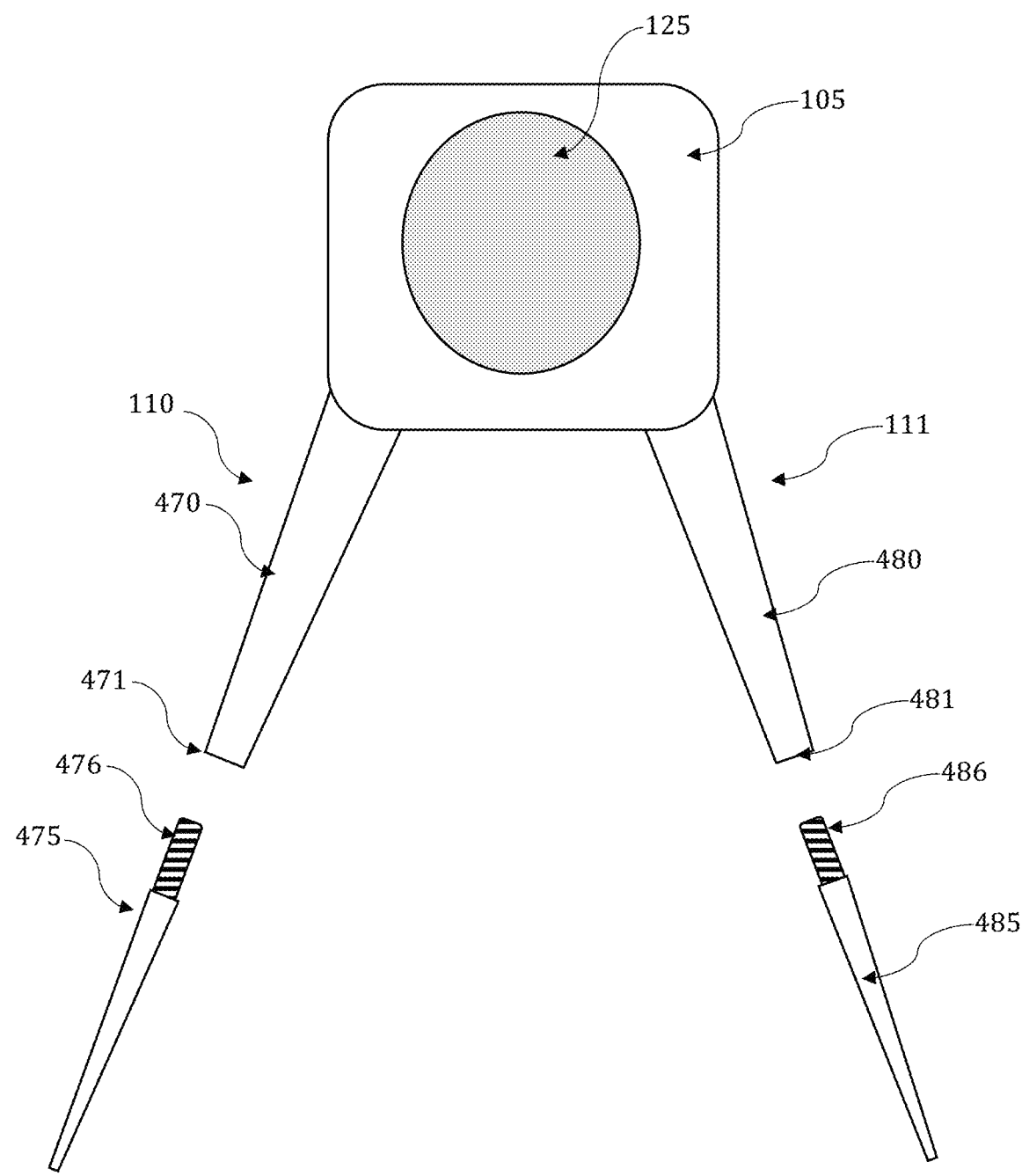
FIG. 4B depicts a rod clamp system with connecting legs in accordance with the disclosed embodiments.

FIG. 4B illustrates another embodiment of rod clasp 105, comprising leg 110 and leg 111. In this embodiment, leg 110 is comprised of a top leg section 470 and a bottom leg section 475. The top leg section 470 includes an internal female threaded fitting 471, with which a male threaded fitting 476 of bottom leg section 475 can fit. In practice, the bottom leg section can optionally be installed on the top leg section 470 to increase the length of leg 110.

Likewise, leg 111 is comprised of a top leg section 480 and a bottom leg section 485. The top leg section 480 includes an internal female threaded fitting 481, with which a male threaded fitting 486 of bottom leg section 485 can fit. The bottom leg section 485 can optionally be installed on the top leg section 480 to increase the length of leg 111.

Figure 4C:
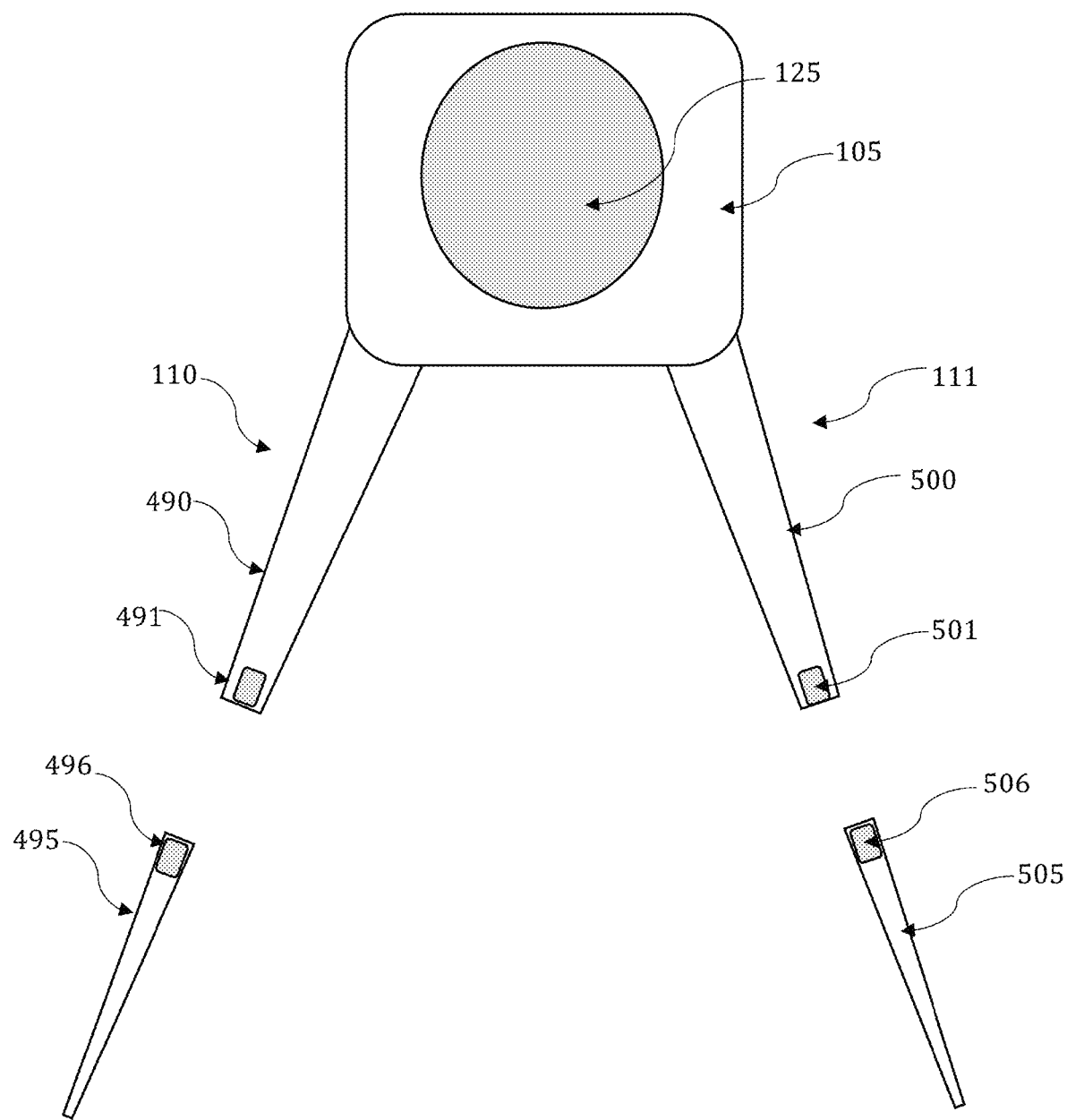
FIG. 4C depicts a rod clamp system with magnetized legs in accordance with the disclosed embodiments.

FIG. 4C illustrates another embodiment of rod clasp 105, comprising leg 110 and leg 111. In this embodiment, leg 110 is comprised of a top leg section 490 and a bottom leg section 495. The top leg section 490 includes a magnet 491. Bottom leg section 495 is fitted with magnet 496. The magnet 496 can be configured such that it is attracted to magnet 491 in top leg section 490. In practice, the bottom leg section 495 can optionally be installed on the top leg section 490 to increase the length of leg 110.

Likewise, leg 111 is comprised of a top leg section 500 and a bottom leg section 505. The top leg section 500 includes a magnet 501. Bottom leg section 505 is fitted with magnet 506. The magnet 506 can be configured such that it is attracted to magnet 501 in top leg section 500. In practice, the bottom leg section 505 can optionally be installed on the top leg section 500 to increase the length of leg 111.

Figure 4D:
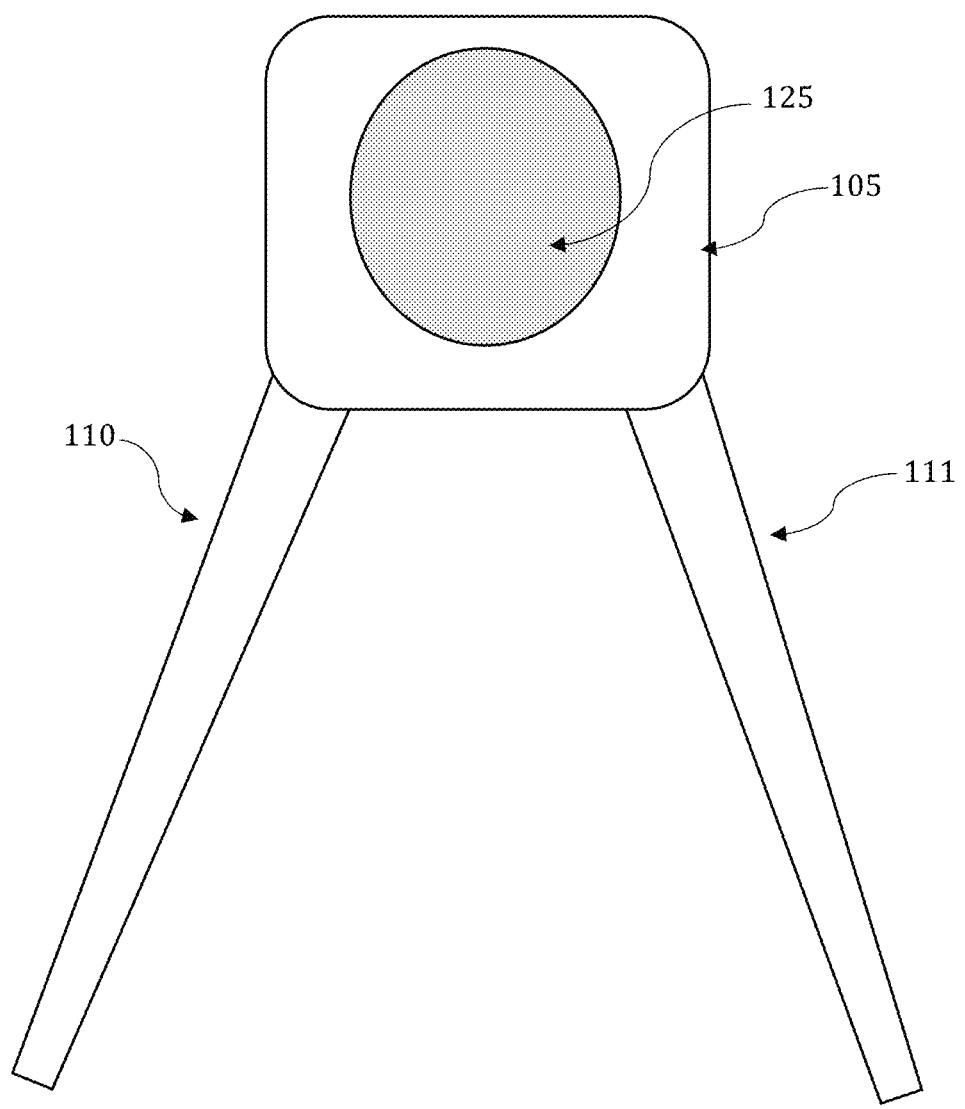
FIG. 4D depicts a rod clamp system with straight legs in accordance with the disclosed embodiments.

FIG. 4D illustrates another embodiment of rod clasp 105. In this case, the leg 110 and the leg 111 are each tapered cylindrical legs, which can optionally be fitted with ground spikes, such as ground spike 455 and ground spike 465.

Figure 5:
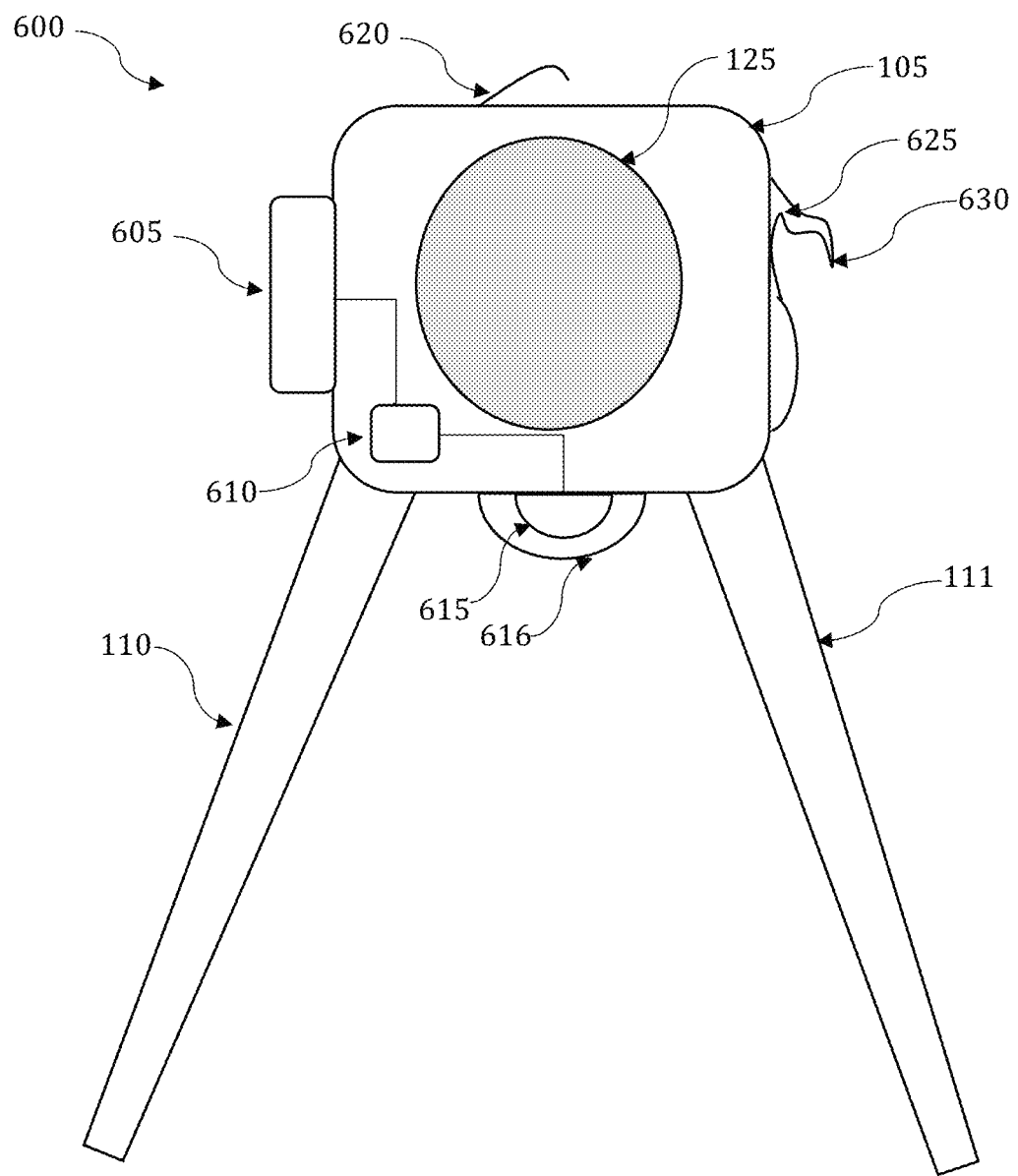
FIG. 5 depicts another embodiment of a rod clamp system in accordance with the disclosed embodiments.

FIG. 5 illustrates an embodiment of a rod clamp system 600. The rod clamp system 600 includes a rod clasp 105 connected to a leg 110 and a leg 111, as detailed herein. The rod clamp system 600 further includes a bottle opener 630 formed on the rod clasp 105. The bottle opener 630 can further include a slot with sharpened edges that can be used as a line cutter 625. The sharpened edges of the line cutter 625 can be used to cut fishing line, or other such material, as necessary during angling.

A strike or line indicator 620 can be provided on the rod clasp 105 body. The strike indicator has fishing line running under it, and comprises a simple electric circuit, powered by a battery. Once the tension in the line increases, it flips or engages an electric connection in the electric circuit that closes the switch. The closed electric connection can set off a light (comprising an LED light or other lower power light), and/or an audible indicator from a loudspeaker each of which can be connected to the electric circuit. The strike indicator 620 can be connected to a light 615 and/or a speaker 605. When the line is struck by a fish, the strike indicator can alert the angler with a sound from the speaker 605 and/or a light (e.g. a colored light, strobing light, etc.) produced by the light 615. The light 615 and the speaker 605 can be operably connected to a battery 610 that can power the light 615 and/or the speaker 605.

The light 615 can include a switch 616. In FIG. 5 the switch 616 is illustrated as a push bulb switch. The push bulb switch can be depressed to turn the light 615 on or off. In certain embodiments, it may be useful to activate the light, for example in low light conditions, to aid in various angling activities.

Figure 6:
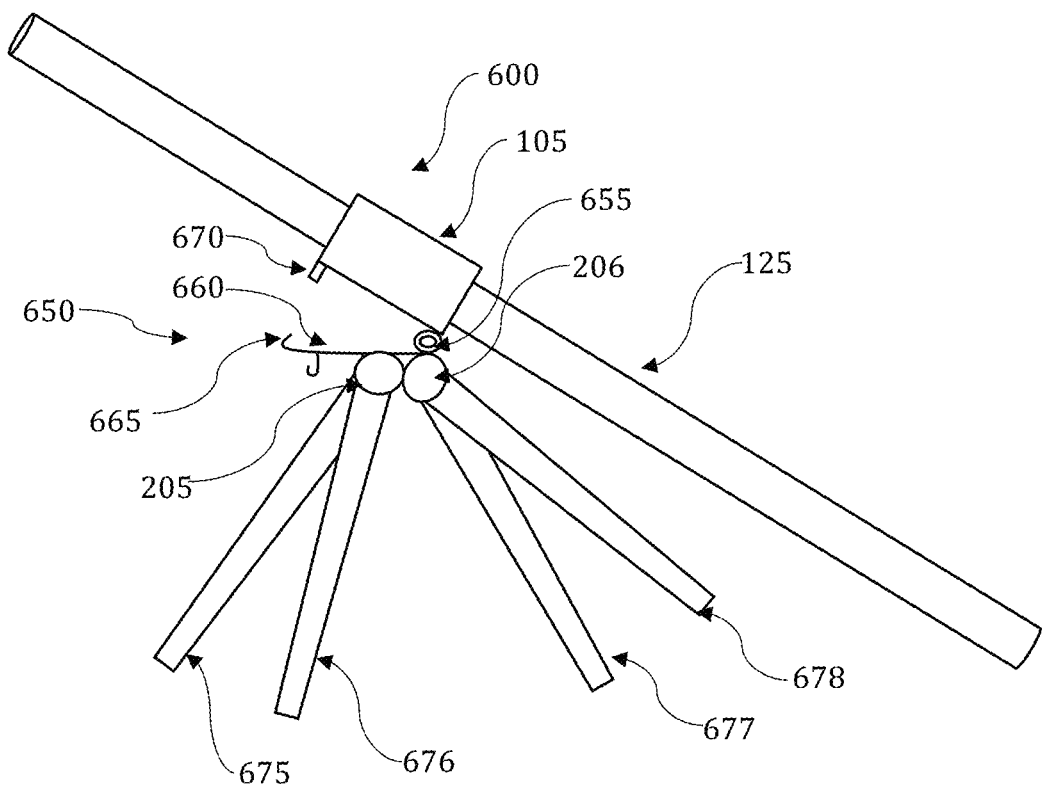
FIG. 6 depicts another embodiment of a rod clamp system incorporating a hook setting assembly, in accordance with the disclosed embodiments.

FIG. 6, illustrates an embodiment of the rod clamp system 600 that further includes a hook setter assembly 650, the purpose of which is to automatically set a hook when it is taken by a fish. The hook setter assembly includes a spring 655 connecting the rod clasp 105 to a platform 660. The distal end of the platform 660 is configured with a hook 665 that can engage with latch 670 formed on the rod clasp 105.

The hook setter assembly 650 can be engaged by connecting the hook 665 to the latch 670, with the rod generally positioned to facilitate hook setting. This may include the distal end of the rod 125 being generally pointed toward the body of water where the angler is fishing. Pressure applied to the end of the rod 125 by a fish taking bait, releases the hook 665 from latch 670. When the hook 665 is released, the force applied by the spring 655, jerks the rod 125 upward in a motion necessary to set the hook.

In certain circumstances where the hook setter assembly 650 is employed, the platform 660 may require additional stability to serve as the base against which the force of the spring 655 exerts force to jerk the rod 125 upward. In such cases, the platform 660 can be comprised to connect to two, three or four legs. Leg 675, leg 676, leg 677, and leg 678 can be configured as illustrated in FIGS. 4A-4D. In certain aspects, leg fittings, such as leg fitting 205 and leg fitting 206 illustrated in FIG. 2 can be configured on platform 660. It should be appreciated that a leg fitting is required for each leg attached to the platform 660. As such, in the embodiment illustrated in FIG. 6, where four legs are illustrated, four leg fittings are required to connect the platform 660 to each of legs 475-478.

Figure 7:
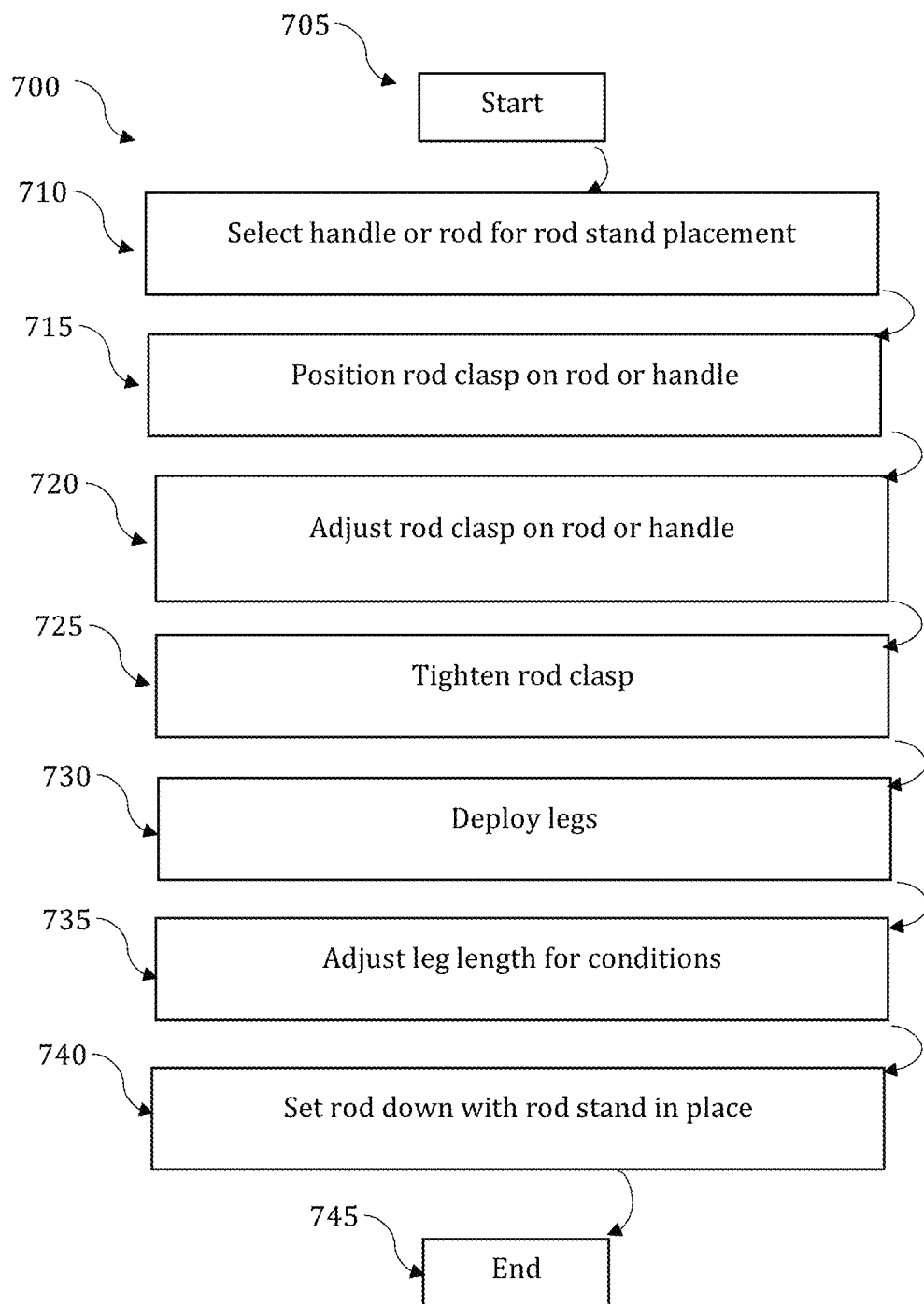
FIG. 7 depicts a flow chart of steps associated with a method for using a rod stand in accordance with the disclosed embodiments.

FIG. 7 illustrates a method 700 for operation of a rod stand system, such as rod clamp system 600, in accordance with the disclosed embodiments. The method begins at 705.

As a preliminary step, it is necessary to determine where the rod stand will be installed on the rod, as shown at step 710. The rod stand can be installed at various positions along the fishing rod, or on the fishing rod handle. In certain cases, it may be desirable to use more than one rod stand, for example, one on the handle of the rod and one on the rod itself. Various installations of the rod stand are possible without departing from the scope of the embodiments disclosed herein.

Once a position for installation has been selected, the rod clasp can be positioned on the rod handle or rod, as shown at step 715. With the rod clasp properly positioned, the rod clasp can be adjusted to the selected location, as shown at step 720. Adjustment of the rod clasp can entail adjusting the inner tapered diameter of a bushing or sleeve to fit the exact position of the rod clasp on the rod. The rod clasp can then be tightened at step 725.

At step 730, the legs associated with the rod clamp system can be deployed. Deployment of the legs can include setting the angle of the legs as necessary for the conditions. These conditions may include topology of the surrounding terrain, and the pitch of the terrain in comparison to the desired resting pitch of the rod. The length of the legs can also be adjusted as shown at step 735.

The rod stand is now fully prepared for use and the rod can be set down with the rod stand installed and the legs deployed, as illustrated at step 740. The method ends at step 745.

Based on the foregoing, it can be appreciated that a number of embodiments, preferred and alternative, are disclosed herein. For example, in one embodiment a system comprises a rod clasp, a leg fitting formed on the rod clasp, and at least one leg attached to the rod clasp with the leg fitting. The system can further comprise a strike indicator formed on an exterior of the rod clasp. In an embodiment, the system further comprises a light formed on an exterior of the rod clasp and a switch connected to the light. In an embodiment, the system further comprises a speaker formed on an exterior of the rod clasp. In an embodiment, the at least one leg further comprises at least two subsections wherein the at least two subsections are telescoping. In an embodiment, the rod clasp further comprises at least one of: a shell clamp, a snap clip, a c-clamp, a lever clamp, a hinge and lever clamp, and a hook clamp. In an embodiment, the system further comprises a bushing arranged between a rod and the rod clasp. In an embodiment, the system further comprises at least one ground spike formed on an end of the at least one leg. In an embodiment, a spring can be formed in the leg fitting, the spring being configured to bias the at least one leg into one of a deployed position and a stored position. In an embodiment, the system further comprises a fishing rod, wherein the rod clasp is installed on the fishing rod.

In an embodiment, a rod stand comprises a rod clasp, a bushing arranged between a rod and the rod clasp, a leg fitting formed on said rod clasp, at least one leg attached to the rod clasp with the leg fitting, and a spring formed in the leg fitting, the spring being configured to bias the at least one leg into one of a deployed position and a stored position. In an embodiment, a strike indicator is formed on an exterior of the rod clasp. In an embodiment, the rod stand further comprises a light formed on an exterior of the rod clasp, a switch connected to the light, and a speaker formed on an exterior of the rod clasp. In an embodiment, the at least one leg further comprises at least two subsections wherein the at least two subsections are telescoping, and at least one ground spike formed on an end of the at least one leg. In an embodiment, the rod clasp further comprises at least one of: a shell clamp, a snap clip, a c-clamp, a lever clamp, a hinge and lever clamp, and a hook clamp. In an embodiment, the rod stand further comprises a fishing rod, wherein the rod clasp is installed on the fishing rod.

In an embodiment an apparatus comprises a fishing rod, a leg fitting formed on said fishing rod, at least one leg attached to the rod with the leg fitting, and a spring formed in the leg fitting, the spring being configured to bias the at least one leg into one of a deployed position and a stored position. In an embodiment, the apparatus further comprises a rod clasp, wherein the rod clasp further comprises at least one of: a shell clamp, a snap clip, a c-clamp, a lever clamp, a hinge and lever clamp, and a hook clamp. In an embodiment, the apparatus further comprises a strike indicator formed on an exterior of the rod clasp, a light formed on an exterior of the rod clasp, a switch connected to the light, and a speaker formed on an exterior of the rod clasp. In an embodiment, the rod clasp is installed on the fishing rod.

It will be appreciated that variations of the above-disclosed and other features and functions, or alternatives thereof, may be desirably combined into many other different systems or applications. Also, it should be understood that various presently unforeseen or unanticipated alternatives, modifications, variations or improvements therein may be subsequently made by those skilled in the art which are also intended to be encompassed by the following claims.

What is claimed is:

1. A rod stand comprising:
a rod clasp;
a bushing arranged between a rod and the rod clasp;
a first leg fitting formed on the rod clasp;
a second leg fitting formed on the rod clasp;
a first leg attached to the rod clasp with the first leg fitting;
a second leg attached to the rod claps with the second rod clasp; and
a first spring formed in the first leg fitting and a second spring formed in the second leg fitting, the springs being configured to bias the legs into one of a deployed position and a stored position.

2. The rod stand of claim 1 further comprising:
a strike indicator formed on an exterior of the rod clasp.

3. The rod stand of claim 1 further comprising:
a light formed on an exterior of the rod clasp;
a switch connected to the light; and
a speaker formed on an exterior of the rod clasp.

4. The rod stand of claim 1 wherein each of the first leg and the second leg further comprise:
   at least two subsections wherein the at least two subsections are telescoping; and
   at least one ground spike formed on an end of each of the first leg and the second leg.

5. The rod stand of claim 1 wherein the rod clasp further comprises at least one of:
   a shell clamp;
   a snap clip;
   a c-clamp;
   a lever clamp;
   a hinge and lever clamp; and
   a hook clamp.

6. The rod stand of claim 1 further comprising:
   a fishing rod, wherein the rod clasp is installed on the fishing rod.

7. An apparatus comprising:
   a fishing rod;
   a first leg fitting formed on said fishing rod;
   a first leg attached to the rod with the first leg fitting;
   a second leg fitting formed on said fishing rod;
   a second leg attached to the rod with the second leg fitting; and
   a spring formed in the first leg fitting, the spring being configured to bias the first leg into one of a deployed position and a stored position.

8. The apparatus of claim 7 further comprising:
   a rod clasp, wherein the rod clasp further comprises at least one of:
   a shell clamp;
   a snap clip;
   a c-clamp;
   a lever clamp;
   a hinge and lever clamp; and
   a hook clamp.

9. The apparatus of claim 8 further comprising:
   a strike indicator formed on an exterior of the rod clasp;
   a light formed on an exterior of the rod clasp;
   a switch connected to the light; and
   a speaker formed on an exterior of the rod clasp.

10. The apparatus of claim 9 wherein the rod clasp is installed on the fishing rod.

* * * * *